(12) United States Patent
Harmsen et al.

(10) Patent No.: US 8,978,368 B2
(45) Date of Patent: Mar. 17, 2015

(54) EXHAUST-GAS AFTERTREATMENT SYSTEM AND METHOD FOR EXHAUST-GAS AFTERTREATMENT

(71) Applicant: Ford Global Technologies, LLC, Dearborn, MI (US)

(72) Inventors: Jan Harmsen, Simpelveld (NL); Matthew Allen Schneider, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 13/789,230

(22) Filed: Mar. 7, 2013

(65) Prior Publication Data
US 2013/0232953 A1 Sep. 12, 2013

(30) Foreign Application Priority Data
Mar. 9, 2012 (DE) .......................... 10 2012 203 769

(51) Int. Cl.
| | | |
|---|---|---|
| *F01N 3/00* | (2006.01) | |
| *F01N 3/035* | (2006.01) | |
| *F01N 3/08* | (2006.01) | |
| *F01N 3/10* | (2006.01) | |
| *F01N 3/20* | (2006.01) | |
| *F01N 13/08* | (2010.01) | |
| *B01D 53/94* | (2006.01) | |
| *F01N 13/00* | (2010.01) | |

(52) U.S. Cl.
CPC .............. *F01N 3/035* (2013.01); *F01N 3/0814* (2013.01); *F01N 3/0842* (2013.01); *F01N 3/106* (2013.01); *F01N 3/2066* (2013.01); *F01N 13/08* (2013.01); *B01D 53/9472* (2013.01); *B01D 53/9477* (2013.01); *F01N 13/0097* (2014.06); *F01N 13/009* (2014.06); *F01N 2340/06* (2013.01); *F01N 2510/068* (2013.01); *Y02T 10/24* (2013.01); *B01D 2255/102* (2013.01)
USPC ............................................... 60/297; 60/299

(58) Field of Classification Search
CPC ..... F01N 3/0814; F01N 3/0842; F01N 3/106; F01N 3/2066; F01N 13/08; F01N 3/035; F01N 13/009; F01N 13/0097; F01N 2340/06; F01N 2510/068; B01D 53/9472; B01D 53/9477; B01D 2255/102; Y02T 10/24
See application file for complete search history.

(56) References Cited

U.S. PATENT DOCUMENTS

| | | | | |
|---|---|---|---|---|
| 6,192,675 | B1 * | 2/2001 | Hirota et al. ..................... | 60/286 |
| 7,334,400 | B2 * | 2/2008 | Yan et al. ......................... | 60/286 |
| 7,628,008 | B2 * | 12/2009 | Ranalli ............................. | 60/278 |
| 7,875,573 | B2 * | 1/2011 | Beutel et al. .................. | 502/339 |
| 8,062,618 | B2 * | 11/2011 | Xu et al. ..................... | 423/239.1 |
| 2005/0252202 | A1 * | 11/2005 | Page et al. ....................... | 60/300 |
| 2006/0100098 | A1 * | 5/2006 | Ura et al. ...................... | 502/325 |
| 2006/0179825 | A1 * | 8/2006 | Hu et al. .......................... | 60/297 |

(Continued)

*Primary Examiner* — Jesse Bogue
(74) *Attorney, Agent, or Firm* — Julia Voutyras; Alleman Hall McCoy Russell & Tuttle LLP

(57) ABSTRACT

An exhaust-gas aftertreatment system (1) for a motor vehicle having a turbocharged internal combustion engine (2) comprises a large-volume lean NOx trap (5) which is connected by means of a short connecting pipe (4) to an outlet of the turbocharger (3), wherein the lean NOx trap (5) has a first region (6) for the storage and/or reduction of NOx and oxidation of NO to form NO2 and/or reduction of hydrocarbon and/or carbon monoxide in the exhaust gas, and a downstream second region (7) for the storage and/or reduction of nitrogen oxides in the exhaust gas.

15 Claims, 2 Drawing Sheets

(56) References Cited

U.S. PATENT DOCUMENTS

| | | | |
|---|---|---|---|
| 2007/0079602 A1* | 4/2007 | Hu et al. | 60/286 |
| 2008/0184701 A1* | 8/2008 | Katoh et al. | 60/299 |
| 2009/0255238 A1* | 10/2009 | Ogai | 60/299 |
| 2010/0251700 A1* | 10/2010 | Wan et al. | 60/287 |
| 2011/0023480 A1* | 2/2011 | Chyo | 60/602 |
| 2011/0154807 A1* | 6/2011 | Chandler et al. | 60/284 |
| 2013/0006504 A1* | 1/2013 | Schreurs | 701/108 |

* cited by examiner

EXHAUST-GAS AFTERTREATMENT SYSTEM AND METHOD FOR EXHAUST-GAS AFTERTREATMENT

CROSS REFERENCE TO RELATED APPLICATIONS

The present application claims priority to German Patent Application Number 102012203769.1, filed on Mar. 9, 2012, the entire contents of which are hereby incorporated by reference for all purposes.

FIELD

The present application relates to an exhaust-gas aftertreatment system and to a method for exhaust-gas aftertreatment. The present application relates in particular to exhaust-gas aftertreatment for a turbocharged engine with a lean NOx trap.

Further emissions restrictions set by future regulations will demand ever more effective exhaust-gas aftertreatment systems, in particular for the reduction of nitrogen oxide (NOx), hydrocarbon (HC) and/or carbon monoxide (CO) emissions and particle emissions from lean-burn internal combustion engines. A concept for NOx regulation exists in which NOx is stored during lean-burn operation and the stored NOx is regenerated by means of periodic rich operation.

Lean NOx traps or LNTs may have a cost disadvantage because, for the simultaneous control of CO, HC and NOx, they must be laden with a large amount of platinum group metals (PGM).

With increasing demands for the reduction of the NOx concentration in the exhaust gas, one solution could consist in increasing the LNT volume in order to attain the demanded NOx level at the tailpipe and in order to comply with further potential driving cycles or user profiles.

US 2011/0061371 A1 describes a hydrocarbon and NOx trap for the reduction of NOx emissions generated during a cold start. The trap has two zones or layers, wherein one zone is the hydrocarbon trap and the other zone is the NOx trap.

US 2009/0217652 A1 and US 2011/0099975 A1 present an oxidation catalytic converter having a plurality of zones or layers in order to optimize the conversion of CO and HC. The zones are laden with different amounts of platinum group metals.

The present application, in some embodiments, operates to improve the reduction of NOx emissions in an inexpensive manner.

According to a first aspect of the present application, an exhaust-gas aftertreatment system for a motor vehicle having a turbocharged internal combustion engine comprises a large-volume lean NOx trap (LNT) which is connected by a short or very short connecting pipe to an outlet of the turbocharger, wherein the lean NOx trap has a first region for the storage/reduction of NOx and oxidation of NO to form NO2 or else for the reduction of hydrocarbon (HC) and/or carbon monoxide (CO) in the exhaust gas, and a downstream second region for the storage and/or reduction of nitrogen oxides (NOx) in the exhaust gas. For this purpose, the first region may comprise a coating with a relatively high proportion of PGM and relatively little or no NOx storage material, and the second region may comprise relatively little PGM and a relatively large amount of NOx storage material. The expression "large-volume" means that the volume of the LNT, in particular of the second region, is large enough to realize a storage/reduction of the NOx concentration to below a desired threshold, even if the concentration of platinum group metals (PGM) is lower than in a conventional LNT. The expression "short" means that the exhaust gas heats up the first region as quickly as possible such that a storage of NOx and oxidation of NO to form NO2 and a reduction of HC and/or CO can take place. Said temperature is usually approximately 170 to 200° C.

The LNT may have a large volume because it can then also comprise a large amount of NOx storage material in order thereby to attain very low NOx emissions. Since the first region has a high proportion of PGM for CO/HC and/or NOx control, the second region with a low proportion of PGM can, without cost disadvantage, be dimensioned to be of adequately large size for the storage and/or reduction of nitrogen oxides.

According to the present application, the use of a turbocharger and the short connecting pipe, that is to say the arrangement of the LNT spatially close to the turbocharger, ensure that exhaust gas at a relatively high temperature flows into the LNT. Said relatively high temperature in the region of approximately 170 to 200° C. permits storage of NOx and also a reduction of HC and/or CO in the first region of the LNT. A further storage and/or conversion of NOx which is less temperature-critical takes place in the second region situated downstream. When the temperature is high enough, the stored NOx can be reduced in a rich operating mode. Said modular construction of the LNT permits a cost reduction because, for the respective reduction and/or conversion of constituents of the exhaust gas, the required conditions, such as for example the amount of platinum group metals (PGM), need to be provided not throughout the entire LNT but rather only in the individual regions.

The first and the second region may be arranged in one housing, which permits a compact construction.

The first region may have a higher proportion of platinum group metals than the second region. This permits a further cost reduction because the expensive platinum group metals are used only where they are actually required, specifically for the oxidation of NO to form NO2 and the reduction of hydrocarbon (HC) and/or carbon monoxide (CO). The storage and reduction of NOx also requires PGM, but the presence in the first region makes it possible to use a much smaller amount of PGM in the second region.

The ratio between the first region (6) and the second region (7) may be less than or equal to 0.5. Said ratio optimizes the relationship between more effective exhaust-gas aftertreatment and costs, which in this case are incurred substantially by the amount of PGM. Said optimum relationship may differ for every application.

The length of the connecting pipe may be approximately 5 to 50 cm. The length is very short, and therefore the system heats up as quickly as possible such that the catalyst light-off is reached quickly. This permits a good reduction or conversion of hydrocarbon (HC) and/or carbon monoxide (CO), and storage of NOx and oxidation of NO to form NO2 is also realized.

A diesel particle filter may be arranged downstream of the lean NOx trap, wherein the diesel particle filter may have a first region with a diesel oxidation catalytic converter or an exothermic catalytic converter, and a downstream second region with an SCR washcoat surface. The first region may comprise PGM or may have no such metals. The diesel particle filter permits further aftertreatment of the exhaust gas. It is for example possible for particles and/or NH3, which may be generated for example in the second region of the lean NOx trap, to be filtered and/or reduced.

According to a further aspect of the present application, a method for exhaust-gas aftertreatment for a turbocharged internal combustion engine comprises the following steps:

introduction of hot exhaust gas from the turbocharged internal combustion engine into a first region of a lean NOx trap;

oxidation of NO to form NO2 and/or storage and/or reduction of NOx and/or reduction of hydrocarbon (HC) and/or carbon monoxide (CO) in the exhaust gas in the first region;

conduction of the exhaust gas onward into a second region of the lean NOx trap; and storage and/or reduction of nitrogen oxides (NOx) in the exhaust gas in the second region.

The same advantages and modifications as described above apply.

The expression "hot exhaust gas" encompasses exhaust-gas temperatures at which a so-called light-off temperature or ignition temperature, that is to say the temperature at which the catalytic converter is warm enough to reduce the pollutant emissions with good or optimum effectiveness, is reached. This may be a CO and HC light-off temperature in the first region.

The exhaust gas emerging from the lean NOx trap may undergo further aftertreatment in a diesel particle filter. It is for example possible for particles and/or NH3, which may be generated for example in the second region of the lean NOx trap, to be filtered and/or reduced.

Upstream of the diesel particle filter (DPF), a medium for assisting the aftertreatment may be supplied to the exhaust gas. The medium, for example HC injected or evaporated for the regeneration of the DPF, may be introduced either between the lean NOx trap (LNT) and the DPF or even upstream of the LNT, for example in order to assist processes in the LNT.

The present application will be described in more detail below on the basis of the drawing, in which:

DETAILED DESCRIPTION

The drawings serve merely for the explanation of the present application, and do not restrict the present application. The drawings and the individual parts are not necessarily drawn to scale. The same reference symbols are used to denote identical or similar parts.

Figure 1:
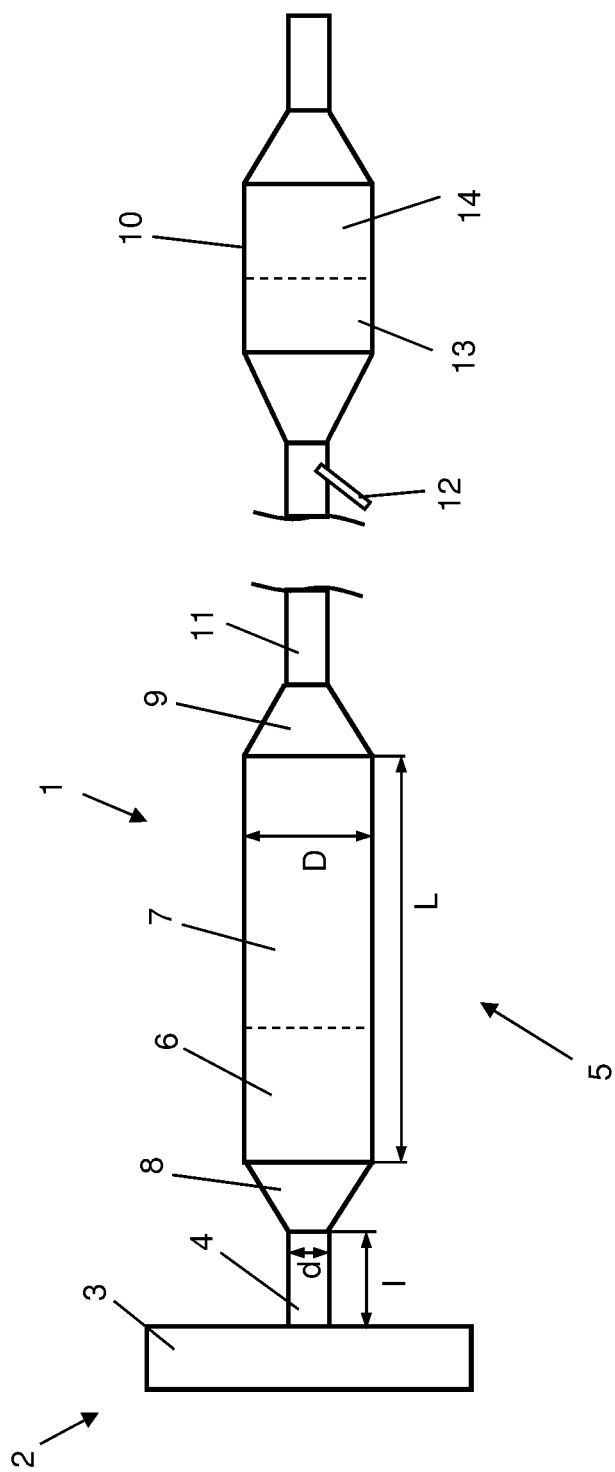
FIG. 1 shows an exhaust-gas aftertreatment system according to the present application.

FIG. 1 shows an exhaust-gas aftertreatment system 1 for an internal combustion engine 2 for example of a motor vehicle, which internal combustion engine is equipped with a turbocharger 3. In this case, the expression "exhaust-gas aftertreatment system" may also encompass the turbocharger 3 in addition to the classic components purely for exhaust-gas aftertreatment. The engine 2 may be a diesel engine and/or a lean-burn engine.

An outlet of the turbocharger 3 is adjoined by a short connecting pipe 4. The length of the connecting pipe 4 is dimensioned such that exhaust gas emerging from the turbocharger 3 experiences an only insignificant temperature loss. "Downstream" means in a direction in which the exhaust gas flows through the exhaust-gas aftertreatment system 1. In FIG. 1, this is from left to right.

The short connecting pipe 4 is adjoined by a large-volume lean NOx trap 5, also referred to as LNT. The lean NOx trap 5 has an upstream first region, strip or zone 6, and an adjoining downstream second region 7. An inlet region or transition region 8 which widens the diameter of the short connecting pipe 4 to the larger diameter of the LNT 5 may be considered separately or may be regarded as belonging to the first region 6. Correspondingly, an outlet region or transition region 9 which decreases the diameter of the LNT 5 again may be considered separately or may be regarded as belonging to the second region 7. The first region 6 and the first region 7 are in this case accommodated in a common housing.

The first region 6 serves at least predominantly for the reduction of hydrocarbons HC and/or carbon monoxide CO in the exhaust gas. In addition to this, oxidation of NO to form NO2 and storage and/or reduction of NOx also take place. For this purpose, the first region has a high proportion of platinum group metals (PGM). Said high proportion and the spatial proximity to the turbocharger 3, which ensures that an adequate exhaust-gas temperature is reached quickly after a cold start, permit an adequate ignition temperature for the oxidation of NO to form NO2 and storage/reduction of NOx and reduction of HC and CO.

The second region 7 serves for the reduction and/or conversion of nitrogen oxides (NOx) in the exhaust gas and/or for further reduction and/or conversion. For this purpose, it is sufficient for the second region 7 to have a relatively low proportion of platinum group metals. Said region does however have a very large NOx storage capacity. The first region 6 thus has a higher proportion of platinum group metals than the second region 7. The so-called washcoat material or the coating and/or NOx storage material in the second region 7 is adequate, with the low proportion of platinum group metals, for the storage and reduction of NOx. The NOx storage material may be provided in the same amount, and/or with the same structure, in the first region 6 and the second region 7. It is however preferable for the first region 6 to be optimized for a fast light-off and for the second region 7 to be optimized for the storage of a large amount of NOx.

With the following dimensions of the short connecting pipe 4 and the LNT 5, efficient operation of the exhaust-gas aftertreatment system 1 is ensured. This means that the concentration or amount of NOx, HC and/or CO in the exhaust gas lies below the desired threshold values.

The length l of the short connecting pipe 4 may be in the range from approximately 5 to 50 cm. Here, the length l may vary depending on the application, for example on the engine used. The connecting pipe 4 is preferably as short as possible. The length l may be of the same order of magnitude as the diameter D of the lean NOx trap 5, but is preferably smaller.

The second region 7 has a larger volume than the first region 6. The second region 7 is at least twice as large as the first region 6. Depending on the application, that is to say in particular depending on the amount of NOx to be reduced and/or to be stored, the second region 7 may also be significantly larger, for example five to eight times as large, or larger still. The volume ratio between the first region 6 and the second region 7 is accordingly optionally less than or equal to 0.5 (volume of region 6 to volume of region 7).

Downstream of the LNT 5 there is provided, as a further optional constituent part of the exhaust-gas aftertreatment system 1, a diesel particle filter 10 (DPF). The diesel particle filter 10 is connected to the lean NOx trap 5 via a pipe 11. Since the diesel particle filter 10 may be arranged spatially remote from the LNT 5, the pipe 11 may be considerably longer than the short connecting pipe 4. It is however also possible for no pipe 11 to be provided, and for the DPF to be arranged in the same housing as the LNT.

Downstream of the diesel particle filter 10 there is arranged an injector or evaporator 12, which introduces into the exhaust gas media or additives for exhaust-gas aftertreatment in the diesel particle filter 10.

The DPF 10 may have an optional SCR (selective catalytic reduction) coating and/or further catalysts/functions or an LNT on a DPF substrate. The concept of SCR on a DPF substrate may be advantageous if the LNT 5 is arranged close to the turbocharger 3 and produces NH3. It is then possible for NH3 to be captured in the DPF 10 and utilized for an additional conversion of NOx on the DPF substrate. The formation of the second region 7 of the LNT 5 with a low PGM concentration may be configured such that NH3 is produced. The additional conversion of NOx by the DPF 10 can be further increased in this way.

In another embodiment of the DPF 10, the latter may have a first region 13 and a downstream second region 14. The first region 13 has a diesel oxidation catalyst (DOC) coating, whereas the second region 14 is formed in the manner of a DPF, for example with an SCR washcoat coating or material. In this case, the injector 12 introduces HC into the exhaust gas upstream of the DPF 10 in order to assist a regeneration of the DPF.

Different refinements of the exhaust-gas aftertreatment system 1 or of the LNT 5 will be described on the basis of FIGS. 2a, 2b and 2c.

Figure 2A:
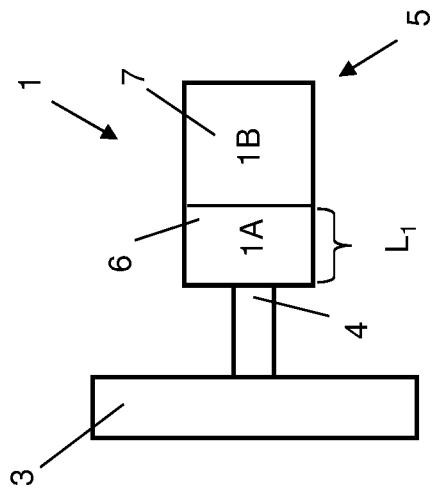
FIGS. 2a, 2b and 2c show special refinements of an exhaust-gas aftertreatment system or lean NOx trap according to the present application.

The configuration of the LNT 5 illustrated in FIG. 1 is shown in simplified form in FIG. 2a. The first region 6 has a PGM level 1A higher than the PGM level 2A of the second region 7. The first region 6 has a smaller volume than the second region.

Figure 2B:
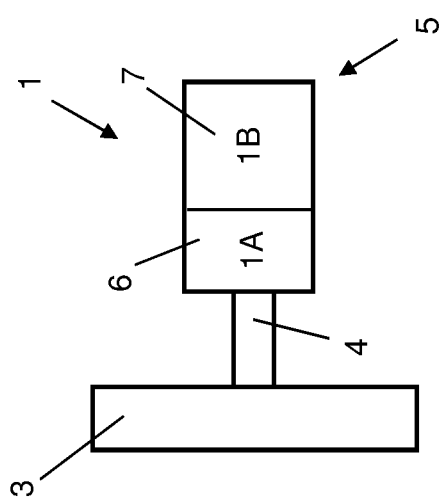
Figure 2C:
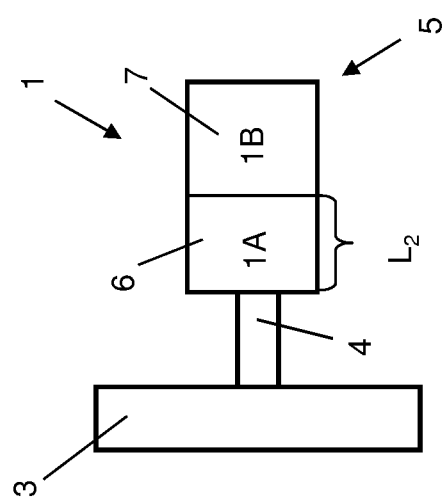

FIGS. 2b and 2c illustrate exhaust-gas aftertreatment systems 1 or LNTs 5 which are configured for a colder exhaust-gas temperature than in FIG. 1.

In FIG. 2b, the first region 6 has a PGM level 1B higher than the PGM level 2B of the second region 7 and higher also than the PGM level 1A of the first region 6 from FIG. 2a. In other words, for a lower exhaust-gas temperature, the amount of PGM in the first region 6 of the LNT 5 can be increased. The PGM amount 2B of the second region 7 from FIG. 2b may be adapted to the requirements, and may then be smaller or larger than or equal to the PGM amount 2A from FIG. 2a.

In FIG. 2c, the PGM amount 2A of the first region 6 corresponds to the PGM amount 1A of the first region 6 from FIG. 2a. However, the length $L_2$ of the first region 6 from FIG. 2c is greater than the length $L_1$ of the first region 6 from FIG. 2b. In other words, for a lower exhaust-gas temperature, the length L of the first region 6 of the LNT 5 can be increased.

During operation of the exhaust-gas aftertreatment system 1 or of the LNT 5, hot exhaust gas, such as exhaust above a threshold warmed-up temperature, from the turbocharged internal combustion engine 2 is conducted into the first region 6 of the LNT 5, wherein there, the exhaust gas undergoes an oxidation of NO to form NO2 and a storage/reduction of NOx and HC and/or a reduction of CO which is, for example, PGM-based. The exhaust gas flows, or is conducted onward, into the second region 7, where a further storage/reduction of NOx takes place. The exhaust gas subsequently undergoes further aftertreatment in a DPF 10. Depending on the construction of the DPF 10, one or more media or additives for assisting the treatment or a regeneration of the DPF 10 may be introduced into the exhaust gas by means of an injector 12.

The invention claimed is:

1. An exhaust-gas aftertreatment system for a motor vehicle having a turbocharged internal combustion engine, comprising:

a lean NOx trap which is connected via a connecting pipe to an outlet of the turbocharger, the connecting pipe having a smaller volume than the lean NOx trap, wherein a diameter of the lean NOx trap defines a maximum length of the connecting pipe, and wherein the lean NOx trap has a first region for one or more of storage of NOx, reduction of NOx, oxidation of NO to form NO2, reduction of hydrocarbons and reduction of carbon monoxide in the exhaust gas, and a downstream second region with a larger volume than the first region for one or more of storage of NOx and reduction of NOx in the exhaust gas.

2. The exhaust-gas aftertreatment system as claimed in claim 1, wherein the first and the second region are arranged in one housing.

3. The exhaust-gas aftertreatment system as claimed in claim 2, wherein the first region has a higher proportion of platinum group metals than the second region.

4. The exhaust-gas aftertreatment system as claimed in claim 3, wherein a ratio of the platinum group metals between the first region with the higher proportion and the second region is less than or equal to 0.5.

5. The exhaust-gas aftertreatment system as claimed in claim 4 wherein the length (1) of the connecting pipe is between 5 to 50 cm.

6. The exhaust-gas aftertreatment system as claimed in claim 5, wherein a diesel particle filter is arranged downstream of the lean NOx trap, wherein the diesel particle filter has a first region with a diesel oxidation catalytic converter or an exothermic catalytic converter, and a second region downstream of the first region with an SCR washcoat surface.

7. A method for exhaust-gas aftertreatment for a turbocharged engine, comprising:
introducing hot exhaust gas from the turbocharged internal combustion engine into a first region of a lean NOx trap having a diameter that defines a maximum length of a connecting pipe connecting the lean NOx trap to the turbocharged internal combustion engine;
oxidizing NO to form NO2;
storing and reducing NOx, hydrocarbons, and carbon monoxide in the exhaust gas in the first region;
conducting exhaust gas onward into a second region of the lean NOx trap; and
storing and reducing nitrogen oxides in the exhaust gas in the second region.

8. The method for exhaust-gas aftertreatment as claimed in claim 7, wherein the exhaust gas emerging from the lean NOx trap undergoes further aftertreatment in a diesel particle filter.

9. The method for exhaust-gas aftertreatment as claimed in claim 8, wherein, upstream of the diesel particle filter, a medium for assisting the aftertreatment is supplied to the exhaust gas.

10. A method, comprising:
directing exhaust gas from a turbocharger outlet directly to a NOx trap with a diameter that defines a maximum length of a connecting pipe connecting the NOx trap to the turbocharger outlet, the NOx trap having an upstream and downstream region in one housing, the upstream region having a higher proportion of platinum group metals than the downstream region with a volume ratio between the first region and the second region less than or equal to 0.5.

11. The method of claim 10 wherein the upstream region is for storage and reduction of NOx and oxidation of NO to form NO2 and for reduction of hydrocarbons and carbon monoxide, and the downstream region is for storage and reduction of nitrogen oxides.

12. The method of claim 10 wherein a distance between an inlet to the housing and the turbocharger outlet is between 5 to 50 cm.

13. The method of claim 12 further comprising flowing exhaust from the housing directly to a diesel particle filter, the diesel particle filter having a first region with a diesel oxidation catalytic converter, and a second region downstream of the first region with an SCR washcoat surface, the particulate filter regions in a common filter housing.

14. The method of claim 13 wherein the oxidation catalytic converter and the SCR washcoat include no platinum group metals.

15. The method of claim 14 further comprising injecting a reductant include aqueous urea between the NOx trap and particulate filter, the injecting occurring upstream of the first upstream region of the particulate filter and downstream of the downstream region of the NOx trap.

* * * * *